United States Patent [19]

Saito

[11] 4,112,830
[45] Sep. 12, 1978

[54] EXTRACTING BLACK TEA AND COFFEE AND CLOSED EXTRACTOR THEREFOR

[76] Inventor: Isamu Saito, 201, 3-12, 1-chome, Akabanedai, Kita-ku, Tokyo, Japan

[21] Appl. No.: 649,230

[22] Filed: Jan. 15, 1976

Related U.S. Application Data

[63] Continuation-in-part of Ser. No. 427,246, Dec. 21, 1973, abandoned.

[30] Foreign Application Priority Data

Dec. 27, 1972 [JP]  Japan ..................... 48/590

[51] Int. Cl.$^2$ .......................................... A47J 31/057
[52] U.S. Cl. .................................................. 99/300
[58] Field of Search ................. 99/300, 289, 292, 294, 99/298–299, 302, 304, 307–308; 239/227, 566, 567; 134/167; 222/526

[56] References Cited

U.S. PATENT DOCUMENTS

| | | | |
|---|---|---|---|
| 1,319,984 | 10/1919 | Wolff | 99/294 UX |
| 2,210,126 | 8/1940 | Risien et al. | 99/302 R |
| 2,726,666 | 12/1955 | Oxford | 239/227 X |
| 2,878,746 | 3/1959 | Schwinger | 99/298 X |
| 3,078,045 | 2/1963 | Meuche | 239/567 X |
| 3,224,360 | 12/1965 | Wickenberg et al. | 99/292 |

FOREIGN PATENT DOCUMENTS

| | | | |
|---|---|---|---|
| 1,291,139 | 3/1962 | France | 99/308 |
| 436,013 | 5/1948 | Italy | 99/307 |

*Primary Examiner*—Harvey C. Hornsby
*Assistant Examiner*—Arthur O. Henderson
*Attorney, Agent, or Firm*—Robert E. Burns; Emmanuel J. Lobato; Bruce L. Adams

[57] ABSTRACT

Method and apparatus for making tea or coffee for drinking comprising heaping tea in an extractor and subjecting successive areas of the heaped tea to periodic sprinkling during successive intervals of sprinkling, with cold tap water, each followed by intervals of wet-expanding the tea until the tea is substantially completely wet-expanded. The sprinkling intervals are timed to allow the wet-expanding to take place after each sprinkling of a same area and without collapsing of the wet-expanded tea. The tea resulting from the wetting is filtered out while removing air bubbles therefrom. The extractor has a sprinkler continuously driven during the sprinkling period and the filtrate is taken out through a pipe perforated axially extending into a filtrate-receiving container. The filtrate is delivered as a tea drink and may be stored in a glass container or the like for prolonged periods without loss of flavor. Coffee is made in the same apparatus by using powdered coffee sprinkled with cold tap water and wet-expanded, filtered while removing air bubbles therefrom and then stored for delivery as a drink. The extractor has a vacuum pump that controls the flow-rate with the filter of the extracted tea or coffee maintaining the tea leaves or coffee constantly immersed to insure freedom thereof from contact with the air.

7 Claims, 3 Drawing Figures

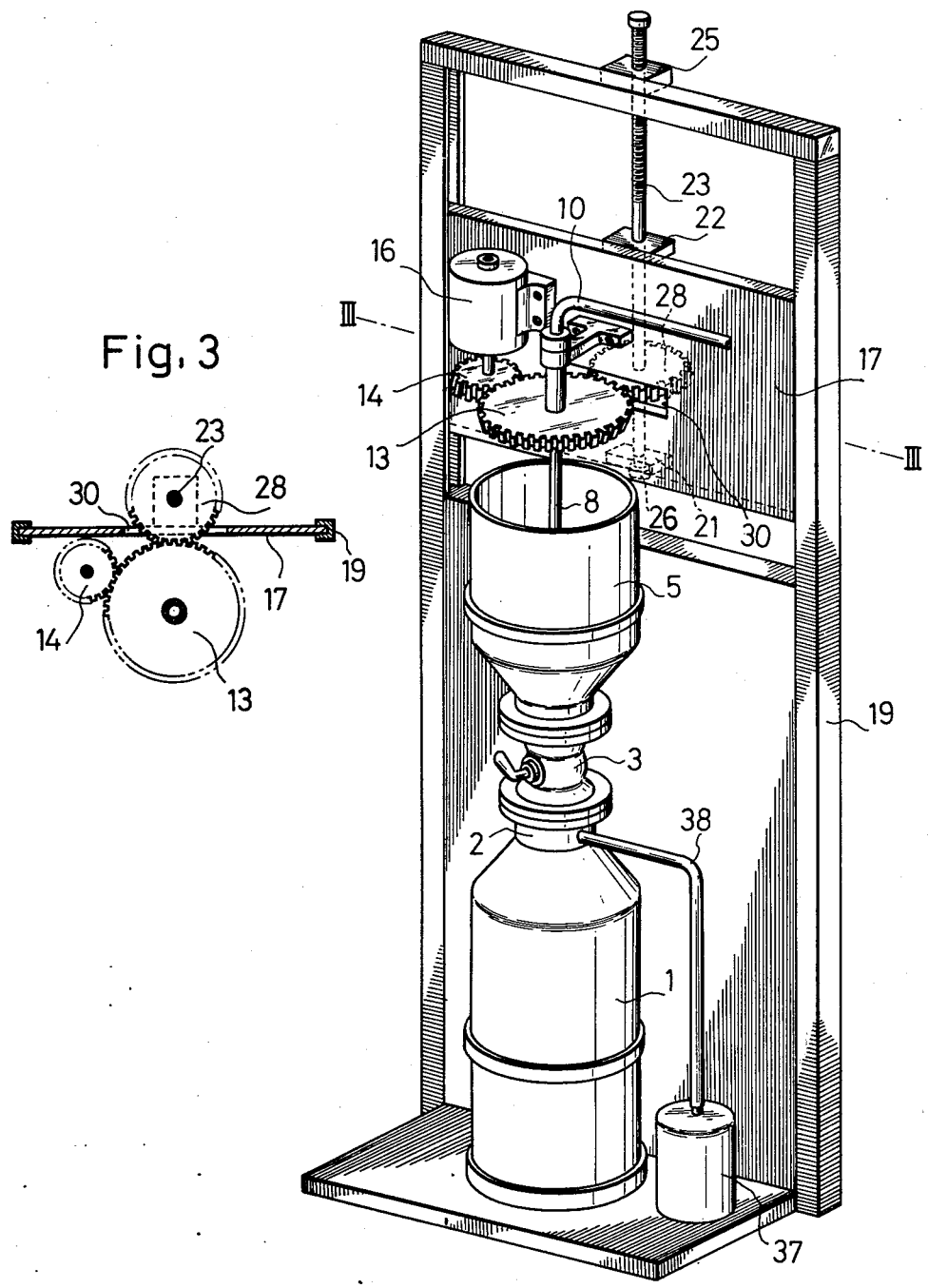

EXTRACTING BLACK TEA AND COFFEE AND CLOSED EXTRACTOR THEREFOR

This is a continuation-in-part application of my application Ser. No. 427,246 filed Dec. 21, 1973 now abandoned.

BACKGROUND OF THE INVENTION

This invention relates generally to the extracting of coffee and black tea and more particularly to apparatus for extracting a ground powdered coffee and fine leaves of black tea in water at room temperature.

Conventional extracting apparatus for extracting a drink of coffee or tea from a ground powder of coffee and fine leaves of black tea at low temperatures are known. Generally the extraction is carried out in an open condition such that various factors effecting the loss of flavor, transparency of the filtrate and fragrance of the coffee and black tea drink occur. Heretofore these unfavorable causes of loss of flavor etc. have not been dealt with by the known extractors.

An investigation by the applicant of known extraction apparatus for coffee and tea as to the construction of the filter, the filtering process, the relationship between flow-down quality and flow-down speed of extracted solutions, the influence of oxidation (deterioration of flavor), has been carried out. Furthermore the ingress of bacteria floating in open air resulting from the exposure of the coffee and black tea during their extraction effecting a loss of flavor and change in quality (unfavorable preservation), the stirring processes and stirring apparatus etc. have been such that unfavorable results occur. That is to say these various factors have resulted in production of coffee or tea that does not have the optimum flavor and cannot be stored for long periods.

SUMMARY OF THE INVENTION

Investigation of the known coffee and tea extractors has resulted in the production of an apparatus of new structure carrying out a process in accordance with the invention. The extracting of coffee from a ground powder coffee and fine leaves of black tea in water at ordinary temperature is carried out in a "closed" container with tea leaves or powdered coffee free from contact with the outer air thereby obtaining excellently natural-flavored drink with its full fragrance and freshly transparent with long-preservative characteristics.

It is a principal object of the present invention to provide an apparatus for carrying out the above desired characteristics of coffee and black tea extraction.

Another object is to provide an extraction apparatus provided with a flow-down pipe from an immersing-tank for delivering a filtered coffee drink or tea to a drink-receiving tank along a path having openings therein or perforations to allow the escape of air bubbles thereby preventing the entrapment of air bubbles in the tea or coffee filtrate in order to preserve the flavor of the tea and coffee drinks and reduce oxidation.

According to the invention a coffee and tea-making or extraction apparatus has an immersing-tank for making tea or coffee filtrate pass through a filter in the immersing tank. A sprinkler in the immersing tank constitutes a horizontal pipe rotationally driven continuously during a sprinkling period divided into sequential wetting and expansion intervals of the different areas of treated or wetted tea in the immersing-tank. The successive wetting intervals are followed by wet-expansion intervals of the tea being sprayed and the wetting takes place without collapse of the tea which has expanded during the wet-expanding intervals.

The flow rate from the immersing-tank to the lower liquid-receiving or drink-receiving tank is controlled to control the quality of the filtrate as to transparency and flavor. The delivery rate is controlled through a flow-down perforated pipe extending into the drink-receiving tank on which the immersing-tank is mounted or connected thereto through a control valve providing selective communication between the two tanks for selectively allowing the filtrate passed from the filter to enter the lower tank. The perforated pipe allows escape of air bubbles above the level of the filtrate in the lower tank and the air is removed by a suction pump which also controls the rate of flow of the filtrate through control of the vacuum developed within the lower tank.

Making the tea comprises heaping tea in a solid state in the immersing-tank in the apparatus and sprinkling the same areas so each sprinkled area of wetted heaped tea is subject to successive intervals of wetting the tea and wet-expanding the tea followed by successive intervals of wetting and wet-expanding to make tea. The tea made is filtered to provide a tea filtrate as a drink and while filtering it air bubbles are removed from the filtrate.

Similarly coffee is made by heaping ground coffee on the filter in the immersing-tank and then sprinkling water onto the ground coffee and wet-expanding it and filtering while maintaining the level of water substantially constant.

In making tea or coffee the heaped tea leaves and ground coffee are kept covered with water to avoid contact thereof with air. The filtering rate and down-flow therefrom into the lower drink receiving tank is controlled by application of a vacuum above the level of the drink filtrate in the lower tank to remove the air bubbles released during the down-flow from the filter.

BRIEF DESCRIPTION OF THE DRAWINGS

Other features and advantages of the extractor apparatus in accordance with the invention will be better understood as described in the following specification, and dependent claims with the following drawings in which:

FIG. 2 is an elevation view of the lifting mechanism for part of the apparatus in FIG. 1; and FIG. 3 is a section view taken along section line 3—3 of FIG. 2

DESCRIPTION OF THE PREFERRED EMBODIMENT

Figure 1:
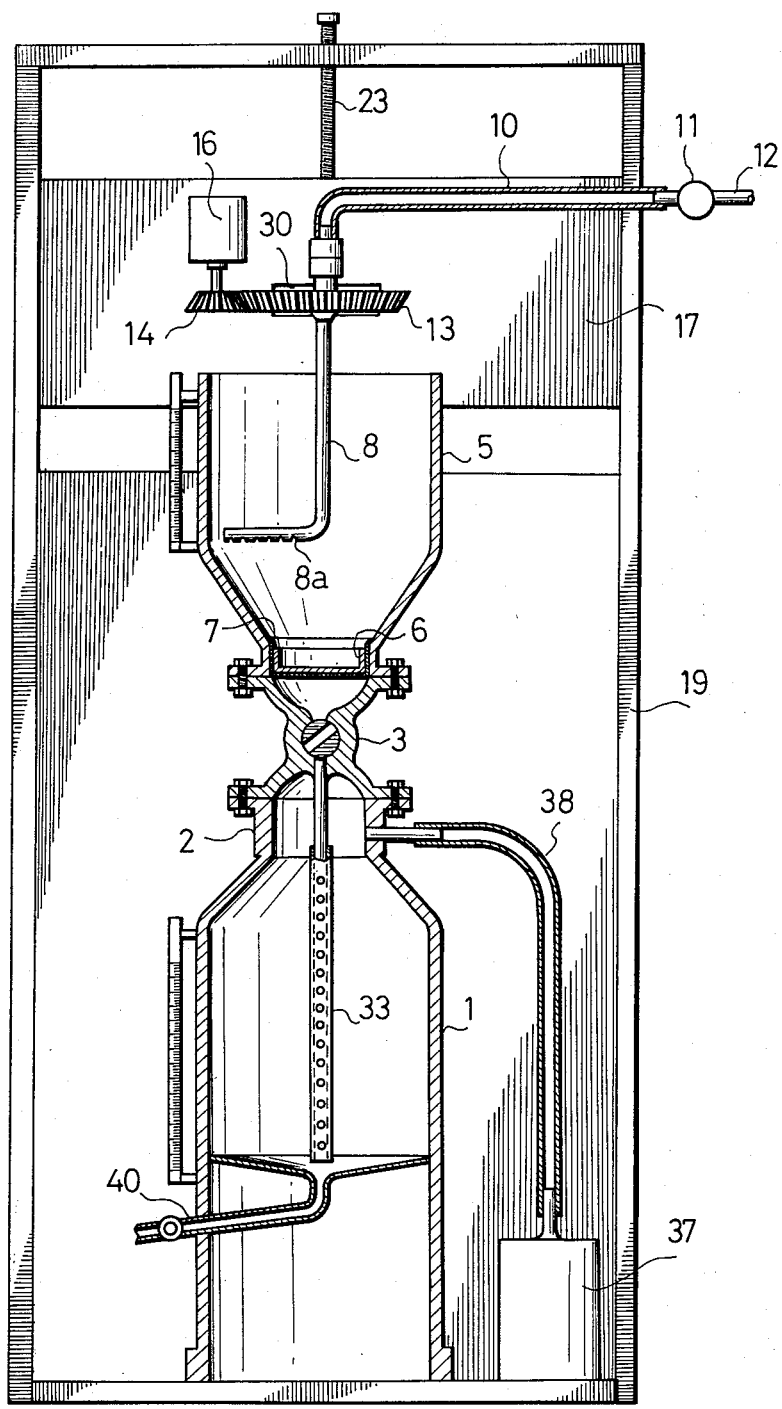
FIG. 1 is an elevation section view of an extractor according to the invention.

The coffee and tea extractor of the present invention shown in the drawings comprises a liquid-receiving or drink-receiving tank 1 made of a suitable material, for example glass, provided with a neck 2 on which is mounted a connector 3 for mounting thereon and connecting thereto an immersing-tank 5. Within the immersing tank is housed a filter cloth 6 on a fixing frame 7 and on which is heaped coffee or tea leaves as hereinafter explained. The immersing-tank 5 is open at the top and within it is mounted a sprinkler 8 provided with a bent pipe portion 8a having perforations therein and connected through a flexible connection or flexible plastic tube 10 to a cold water tap 11 for providing unheated tap water at room temperature from a water line 12.

The sprinkler 8 is driven rotationally by a gear 13 rotationally driven by a pinion 14 connected to a motor shaft 15 on a motor 16 mounted on a panel 17 above the level of the immersing-tank. The sprinkler 8 travels upwardly as it is rotationally driven. In order to provide for this mode of operation the panel 17 is mounted in a channel frame 19 for up and down movement therein as shown in FIG. 2. The frame 19 is mounted on the extractor by means not shown. The panel is provided with bearing projections 21, 22 on which is rotatably mounted a threaded shaft or screw 23 threadably engaged with a thread in a projection 25 mounted on the frame 19. The threaded screw has a stop 26 on the lower end thereof so that as it rotates it lifts the panel 17. Driving connection for driving threaded screw 23 is provided from the gear 14 and rotation gear 13 for driving a gear 28 fixed axially on the threaded shaft 23 and meshing with the rotation drive gear 13 through a window 30 in the panel 17 on which the drive motor is mounted.

According to the present invention provision is made for controlling the down-flow or flow rate downwardly of filtrate passing through the filter 6 upon the making of tea or coffee filtrate. This downward flow is controlled through a valve 30 that provides selective connection between the upper and lower tanks 1, 5 through a perforated pipe 33 extending downwardly and inwardly into the drink-receiving tank 1. The perforations in the pipe allow air bubbles to escape from the filtrate above the level of the liquid drink in the drink-receiving tank. The air is removed by an application of a vacuum suction to the latter lower tank 1 with a vacuum pump 37 connected with a suction tube 38 to the interior of the neck of the lower tank. The vacuum applied can be varied to control the rate of the flow down the flow-down pipes 33.

OPERATION

In order to make tea the apparatus is in a condition in which the filter 6 is secured to the bottom of the immersing-tank by the frame 7 and the connection valve 30 is closed. A definite amount of fine leaves of black tea is poured into the apparatus over the filter cloth and the surface of the heaped leaves of tea are made smooth by means of a stirring spatula. The sprinkling device is then turned on and the sprinkler is rotated to pour water onto the surface of the heaped leaves of tea while keeping a slight clearance upwardly on its heaped surface. As the level of water rises the position of the sprinkler is automatically moved upwardly by the controlled movement of the panel 17 as described before. The sprinkler delivers the desired amount of water within a definite period of time.

As the sprinkler rotates it sprinkles the different areas of the tea leaves so that the successive areas are first wetted and then as the sprinkler moves an interval of wet-expansion takes place followed by an interval of additional wetting and expansion. The successive periodic wetting of the individual areas prevents collapse of their wetted-expansion state. This arrangement causes the heaped tea leaves to serve as a kind of filter for the black tea itself.

After the wetting and expansion intervals the connection valve 30 is opened and the vacuum pump is actuated so that a suction is applied to the filter and the tea filtrate is sucked through the filter into the drink-receiving lower tank 1.

Either tea or coffee drinks made with the apparatus are taken out through a spigot 40.

In the making of the tea the definite depth of water therein is maintained by the sprinkler in order to keep the tea constantly covered so that the air does not have access thereto.

Coffee can be made similarly to the making of tea by using powdered coffee and sprinkling it to wet-expand it similarly to the making of tea.

Those skilled in the art will understand that the following benefits result from the apparatus and method carried out thereby. Since extraction is made in ordinary temperatures in a "closed" container it is possible to filter and extract coffee and black tea by wetting and expanding it in its natural state thereby maintaining the freshness of ground powdered coffee and fine leaves of black tea. The coffee made is natural-flavored, fragrant and transparent. The extracted drink of coffee or tea can be preserved for a long period of time in the apparatus for example 30 to 40 days. Known apparatus and methods require 7 to 10 hours to filter and extract coffee and black tea and in contrast therewith the present apparatus and method are capable of extraction in a very short period of time, for example 1 to 2 hours. The apparatus according to the invention can be made for home use and large scale use for mass production for drinks.

While it has heretofore been very difficult to filter and extract very fine powdered coffee using conventional extracting apparatus the present apparatus ensures the possibility of such extraction and avoids waste and is very economical.

With the method and apparatus according to the invention it is always possible to obtain an extracted drink uniform in quality. Drinks made may be drunken in the form of ice black tea, ice coffee, hot coffee or hot black tea.

Since the extracted drink obtained by the method and apparatus of the invention is made in liquid form it can be made into a concentrated syrup of high quality coffee and black tea. Furthermore it is possible to convert the extracted drink into powder form of coffee or black tea.

What I claim is:

1. Coffee and tea making apparatus comprising, a liquid-receiving tank for containing a tea or coffee filtrate therein in a vacuum-tight manner, an immersing tank mounted above the liquid-receiving tank for receiving heaped tea or coffee therein, a filter in said immersing tank upstream of the liquid-receiving tank, driven sprinkler means in said immersing tank spaced in use from said heaped tea or coffee therein for sequentially sprinkling next adjacent areas of heaped tea or coffee when driven to successive positions overlying said areas with periods of sprinkling each followed immediately by a period of non-sprinkling of the previously wetted area until said coffee or tea is well wet-expanded in said immersing tank for making a tea or coffee filtrate filtered through said filter, drive means for continuously rotating said sprinkler means several rotations during operation for sequentially sprinkling said areas of said heaped tea or coffee each during a sprinkling period of wetting with each period of sprinkling immediately followed by a sequential period of non-wetting of a previously wetted area, the periods of non-wetting constituting expansion intervals of the tea or coffee before a next successive wetting period and sequential expansion interval thereby to preclude collapse of the wetted tea or coffee during the sprinkling, means for connecting said sprinkling means to a source of unheated tap water for sprinkling said water on said heaped tea or coffee, valve means for providing selective communication between the two tanks for selectively allowing filtrate passed through said filter to enter said liquid-receiving tank, and means for periodically drawing filtrate from said liquid-receiving tank as a tea or coffee drink.

2. Coffee and tea making apparatus according to claim 1, including a perforated pipe extending from said valve means extending into said liquid-receiving tank for relieving air bubbles into said liquid-receiving tank above the level of the tea or coffee filtrate therein.

3. Coffee and tea making apparatus according to claim 2, including means to apply a vacuum suction to said liquid-receiving tank above said level of the tea or coffee filtrate therein.

4. Coffee and tea making apparatus according to claim 2, including means for selectively moving said sprinkler means upwardly and downwardly relative to said filter, and said filter being disposed for having said heaped tea or coffee overlying it.

5. Coffee and tea making apparatus according to claim 2, in which said perforated pipe comprises perforations disposed spaced axially thereon.

6. Coffee and tea making apparatus according to claim 1, in which said sprinkling means comprises a horizontal pipe rotatable about a vertical axis and having sprinkling apertures along a length thereof.

7. Coffee and tea making apparatus comprising, an immersing tank for making a tea or coffee filtrate therein, a filter in said immersing tank for receiving heaped tea or coffee thereon, driven sprinkler means in said immersing tank spaced in use from said heaped tea or coffee therein for sequentially sprinkling next adjacent areas of heaped tea or coffee when driven to successive positions overlying said areas with periods of sprinkling each immediately followed by a period of non-sprinkling of the previously wetted area until said coffee or tea is well wet-expanded in said immersing tank for making a tea or coffee filtrate filtered through said filter, drive means for continuously rotating said sprinkler means several rotations during operation for sequentially sprinkling said areas of said heaped tea or coffee each during a sprinkling period of wetting with each period of sprinkling immediately followed by a sequential period of non-wetting of a previously wetted area, the periods of non-wetting constituting expansion intervals of the tea or coffee before a next successive wetting period and sequential expansion interval thereby to preclude collapse of the wetted tea or coffee during the sprinkling, and means for connecting periodically drawing out tea or coffee filtrate passed through said filter as a tea or coffee drink.

* * * * *